*INVENTOR.*
JOHN M. SLATER

TO AMPLIFIER 53

April 22, 1969     J. M. SLATER     3,439,884

SPACE VEHICLE GUIDANCE SYSTEM

Filed April 19, 1967     Sheet 5 of 5

INVENTOR.
JOHN M. SLATER

BY

ATTORNEY

United States Patent Office

3,439,884
Patented Apr. 22, 1969

3,439,884
SPACE VEHICLE GUIDANCE SYSTEM
John M. Slater, Fullerton, Calif., assignor to North American Rockwell Corporation, a corporation of Delaware
Continuation-in-part of application Ser. No. 483,763, Aug. 30, 1965. This application Apr. 19, 1967, Ser. No. 632,033
Int. Cl. G05d 1/10
U.S. Cl. 244—1                      10 Claims

ABSTRACT OF THE DISCLOSURE

A guidance apparatus and method for quickly determining the position of a space vehicle with respect to a set of heliocentric ecliptic coordinates. A sun tracker locates the sun to establish the solar radius vector which determines two of the three angles needed for astronomical position determination. A gyroscope is used to sense the direction of an axis about which zero angular velocity with respect to inertial space is exhibited, in order to establish the third angle.

CROSS-REFERENCE TO RELATED APPLICATION

This application is a continuation-in-part of copending application Ser. No. 483,763 entitled "Guidance System" by John M. Slater, filed Aug. 30, 1965, now abandoned.

BACKGROUND OF THE INVENTION

Field of the invention

The present invention relates to a space vehicle guidance system and, more particularly, to a guidance apparatus and method for use with orbital vehicles for quickly determining the position of the vehicle with respect to a set of heliocentric ecliptic coordinates.

Description of the prior art

In order to navigate a surface or space vehicle, a guidance system is usually provided which is operative to define a set of orthogonal coordinates with respect to which velocities and distances can be measured. Many different types of guidance systems have been proposed to establish such a set of coordinates. One technique employs a gyroscopically stabilized platform which is mounted by gimbals to the vehicle so that as the vehicle moves the plaform remains fixed in inertial space. Other systems use frame-mounted gyroscopes in which there is no attempt to maintain a platform fixed in inertial space. Rather, motion along three vehicle-fixed coordinates is measured and converted to motion along a set of earth-fixed or space-fixed coordinates. In any event, it is often necessary to quickly determine the position of a space vehicle and to define a set of orthogonal coordinates at a rapid rate. In the case of a space vehicle launched from the surface of the earth, such rapid acquisition is necessary in certain applications so that the vehicle may be provided with a fully operational guidance system as soon as possible after injection, as may be required in a pursuit or rendezvous mission.

If the launched vehicle contains a gyroscopically stabilized platform, or a set of frame-mounted gyroscopes and a computer, which are maintained fully operative during boost and injection, the problem of rapid acquisition is readily solved as the platform or the frame-mounted gyroscopes together with the computer provide a self-contained reference system. However, for some purposes it is desirable to use systems which remain inactive during launch and are activated only after injection to avoid problems associated with the operation of gyroscopes under high acceleration conditions. And, of course, there always exists the problem of restoring a gyroscopically established reference after a malfunction or a deliberately brought about period of inactivity.

SUMMARY OF THE INVENTION

According to the present invention, a guidance apparatus and method is provided for quickly determining the position of an orbiting vehicle with respect to a set of heliocentric ecliptic coordinates. The present invention is operative to provide quick orientation of an orbiting vehicle by first directing a sun tracker located on the vehicle toward the sun. With the sun tracker pointed at the sun, the line of sight from the tracker to the sun estbalishes the solar radius vector. In this manner, two of the three angles needed for astronomical position determination are established. Inertial means, such as a gyroscope, for example, mounted on the vehicle is used to sense the direction of an axis, normal to the solar radius vector, about which zero angular velocity with respect to inertial space is exhibited, such axis accordingly lying in or parallel to the plane of the earth's orbit. In this manner, the third angle needed for astronomical position determination is established. These operations establish a reference in terms of a particular coordinate ssytem; the heliocentric ecliptic cordinate system. A star-tracker telescope mounted on the vehicle may then be positioned toward a desired star referencing the known axes of the heliocentric ecliptic coordinate system.

OBJECTS

It is, therefore, an object of the present invention to provide a system and a method for quickly locating one or more selected stars from a space vehicle.

It is a further object of the present invention to provide a system and method for quickly determining the position of an orbiting vehicle with respect to a set of heliocentric ecliptic coordinates.

It is, a still further object of the present invention to provide a system and method for quickly pointing a telescope referencing a heliocentric ecliptic set of coordinates so that the instantaneous celestial latitude and longitude of the vehicle and its orientation relative to the ecliptic plane may be determined.

It is another object of the present invention to provide an improved method for acquiring stars from an orbiting space vehicle.

It is still another object of the present invention to provide an apparatus for positioning an orbiting space vehicle in a fixed inertial space coordinate system.

Still other objects, features, and attendant advantages of the present invention will become apparent to those skilled in the art from a reading of the following detailed description of several embodiments constructed in accordance therewith, taken in conjunction with the accompanying drawings wherein:

DESCRIPTION OF THE PREFERRED EMBODIMENTS

Figure 1:
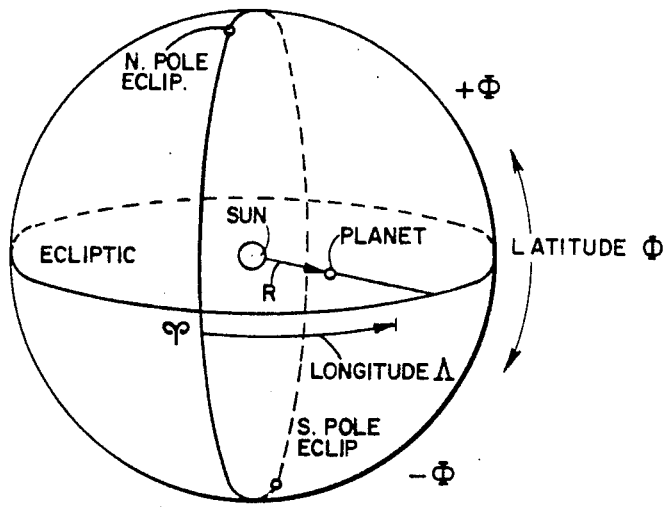
FIGURE 1 is a diagram of the ecliptic coordinate system utilized in the invention.

Referring now to the drawings, and, more particularly, to FIGURE 1 thereof, the invention may be best understood by first defining and illustrating the so-called ecliptic coordinate system in which the apparatus of the present invention functions. The ecliptic coordinate system is one which takes as the base plane that of the earth's orbit about the sun. The radius vector R from the sun to the center of the earth lies in that base plane, and the vector from the sun to a vehicle orbiting the earth is of a direction very closely approximating that of the radius vector R, the dimensions of the earth and close-earth orbits being small compared to the distance to the sun.

In FIGURE 1, celestial latitude is denoted by Φ and is measured north and south for positive and negative values, respectively, from the base plane similar to terrestrial latitude. (The latitude of the center of the earth is at all times zero, by definition.) Celestial longitude is denoted by Λ and is measured through 360° starting from the vernal equinoctial point which is the counterpart of the Greenwich meridian in terrestrial systems. In the heliocentric form of the coordinate system, as illustrated, the origin is at the center of the sun.

Figure 2:
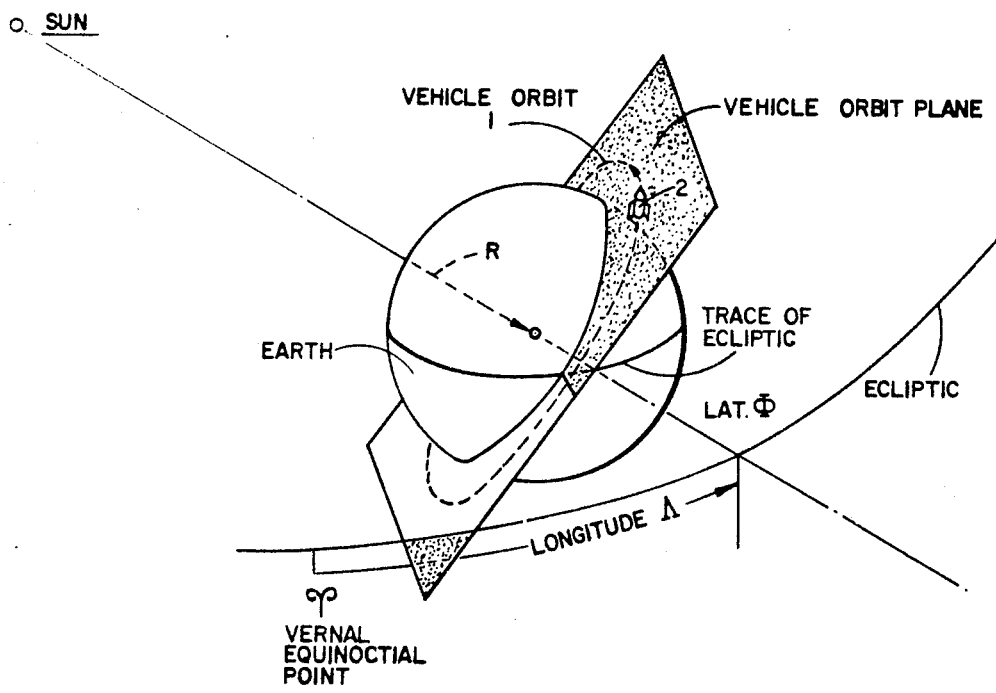
FIGURE 2 illustrates a typical orbital path of a space vehicle with respect to the earth and the sun.

Referring now to FIGURE 2, at any time of the year the earth is at some particular heliocentric longitude. It is at longitude zero at about September 22 each year with a latitude always of zero. If we consider an orbit 1 of an earth satellite vehicle 2 it is seen that the mean value of the heliocentric longitude and latitude of the vehicle is that of the earth upon which is superimposed a small modulation at orbital revolution frequency. The parallax of the earth relative to the sun is about 9 seconds of arc which means that the earth's radius subtends that angle as seen from the sun. The vehicle orbit would describe a cone of maximum amplitude somewhat larger than that value, depending upon the size of the vehicle orbit, which, however, is negligible for present purposes. Thus, henceforth no distinction shall be made between the position of the earth and of the vehicle in the heliocentric system.

Figure 3:
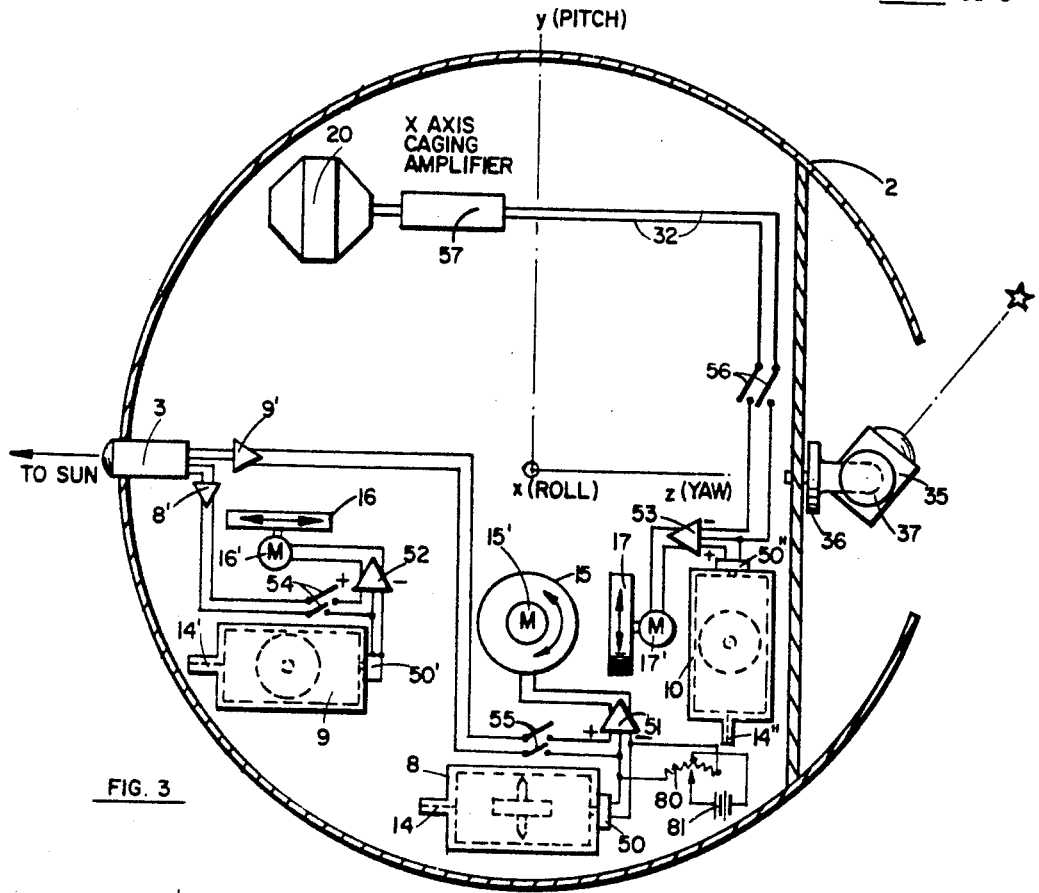
FIGURE 3 shows a first embodiment of the present invention installed in a space vehicle.
Figure 4:
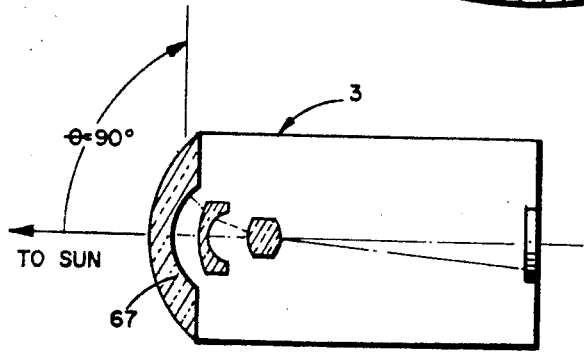
FIGURES 4 and 5 show details of a typical sun tracker for use in the system of FIGURE 3.
Figure 5:
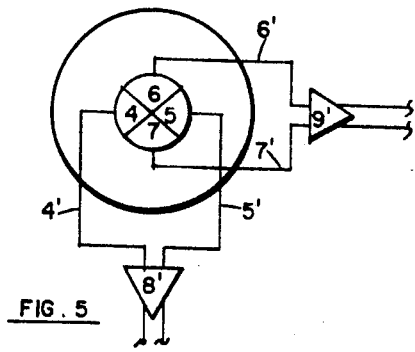

Referring now to FIGURE 3, there is illustrated a first embodiment of the present invention installed in space vehicle 2, in conjunction with other, conventional, apparatus to assist in carrying out the functions of the present invention. A sun tracker 3 is provided of a type known in itself and which is shown in more detail in FIGURES 4 and 5. Sun tracker 3 consists of an objective 67 of "fisheye" type with an object field of approximately a hemisphere ($\theta$ equal to 90°). A typical "fisheye" objective is described by K. Miamato in "Fish Eye Lens," Journal of the Optical Society of America, volume 54, August 1965, page 1050. Objective 67 focuses the image of the sun on quadrantal photodetector electrode pairs 4, 5 and 6, 7, the signals from which go via leads 4', 5', 6' and 7' to a pair of amplifiers 8' and 9'. More particularly, the signals from oppositely disposed electrodes 4 and 5 are applied to amplifier 8' whereas the signals from oppositely disposed electrodes 6 and 7 are applied to amplifier 9'. The outputs of amplifiers 8' and 9' are signals indicative of the phase of the displacement of the sun image from center and also, over a small angular displacement range, the magnitude of the displacement.

Referring back to FIGURE 3, three rate gyroscopes 8, 9 and 10 typically of a type restrained by torsional springs 14, 14' and 14", respectively, and of very moderate sensitivity and accuracy are provided with pickoffs 50, 50' and 50", respectively, to provide signals proportional to rate of turn of vehicle 2 about the x (roll), y (pitch) and z (yaw) axes. The signals from rate gyroscopes 8, 9 and 10 are applied to a plurality of summing amplifiers 51, 52 and 53, respectively, which provide signals to inertial reaction devices of known sort for adjusting the attitude of vehicle 2 about the x, y and z axes. Such attitude controllers are shown for convenience as simple motor-driven reversible inertial wheels 15, 16 and 17 driven by motors 15', 16' and 17', respectively, which receive as their inputs the signals from amplifiers 51, 52 and 53, respectively. Though simple motor driven, reversible wheels are shown for convenience, ordinarily, in practice, more sophisticated torque appliers would be used, e.g., those described in U.S. Patent No. 3,158,340 entitled "Gyroscope Control Apparatus."

The output of amplifier 8' is applied to summing amplifier 52 via a switch 54. The output of amplifier 9' is applied to summing amplifier 51 via a switch 55. The gain of amplifiers 8' and 9' is higher than that of amplifiers 51 and 52 so that when switches 54 and 55 are closed, sun tracker 3 exerts the dominant control on the inertial wheels, as will be explained more fully hereinafter.

Figure 6:
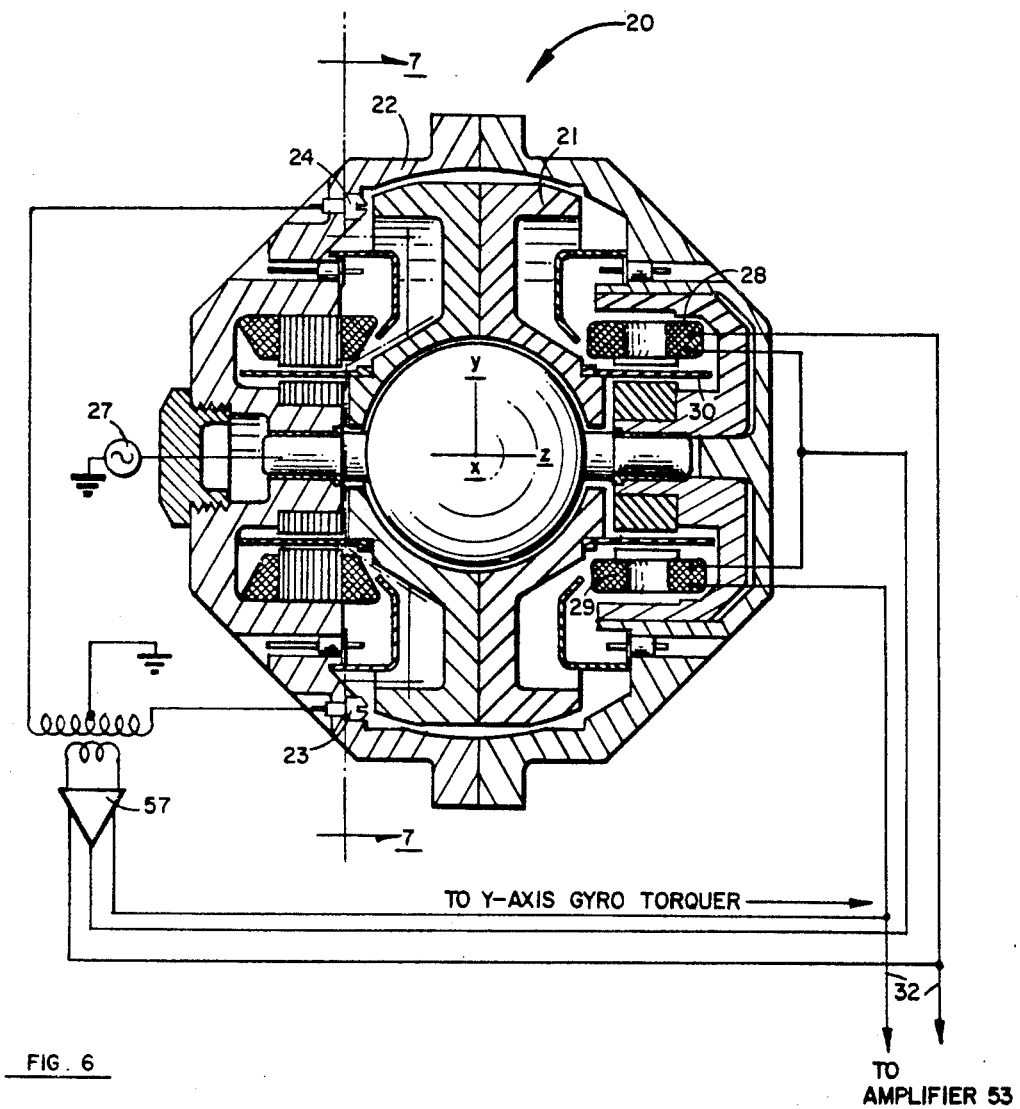
FIGURE 6 shows a typical free rotor gyroscope for use in the system of FIGURE 3.
Figure 7:
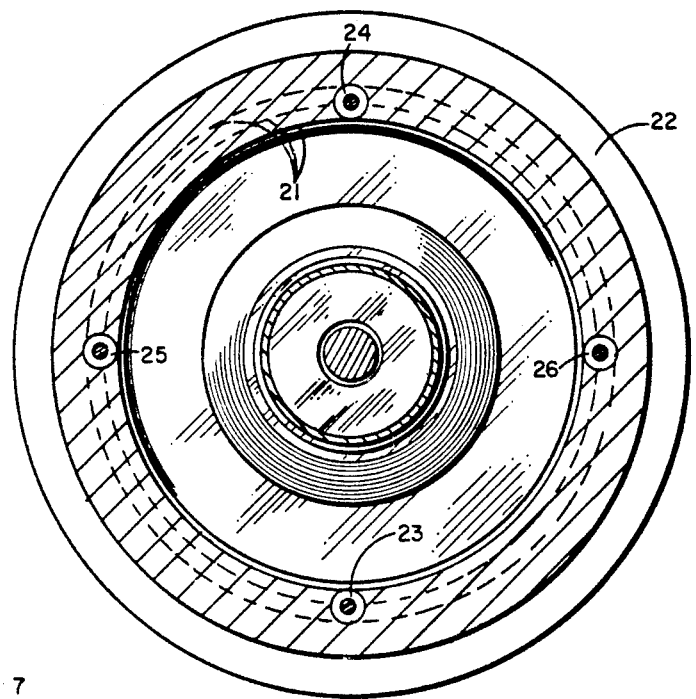
FIGURE 7 is a partial section along lines 7—7 of FIGURE 6 showing the pickoff electrode assembly of the free rotor gyroscope.
Figure 8:
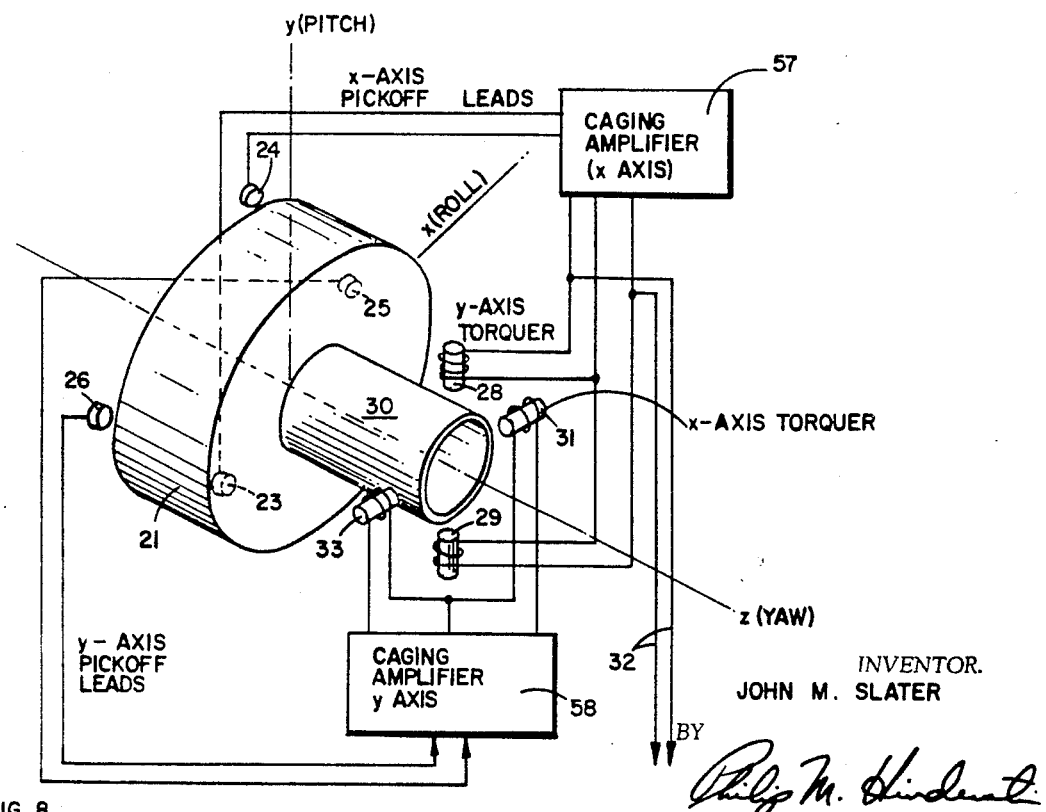
FIGURE 8 is a diagram of the caging circuits of the free rotor gyroscope of FIGURE 6.

According to the invention, there is also provided, in space vehicle 2, a gyroscope 20 of the free rotor type which may be like that described in U.S. Patent No. 3,025,708 entitled "Free-Rotor Gyro Motor and Torquer Drives" to J. M. Slater et al. This type of gyroscope is also described in detail in "Intertial Guidance Sensors" by J. M. Slater, Reinhold Publishing Corp., New York 1964, page 98. As shown in FIGURE 6, gyroscope 20 comprises a rotor 21 which is mounted by a gas-lubricated ball and socket for three degrees of freedom relative to a case 22. A two-axis pickoff system is provided consisting of a first pair of pickoff electrodes 23 and 24 and a second pair of pickoff electrodes 25 and 26 (FIGURE 7; not shown in FIGURE 6) connected in circuits such as that shown in FIGURE 47, page 99 of "Inertial Guidance Sensors," supra, so that upon tilt of rotor 21 relative to either pair of plates, a suitable phase and amplitude sensing signal is produced. Rotor 21 is maintained at a suitable potential from an A.C. source 27. The arrangement of the pickoff electrodes may be seen more clearly from FIGURES 7 and 8.

Pickoff plate pair 23 and 24 detect rotor deflection about the x (roll) axis of vehicle 2 whereas pickoff plate pair 25 and 26 detect rotor deflection about the y (pitch) axis.

Gyroscope 20 has a two-axis torquer of the eddy current drag type, described in more detail in "Inertial Guidance Sensors," supra, p. 100, of which only the y axis assembly is shown in detail in FIGURE 6. The y axis torquer consists of a pair of differentially energized electromagnets 28 and 29 operating on a Manganin sleeve 30 attached to rotor 21. This torquer produces a torque about the y axis causing precession of rotor 21 about the x axis. A similar torquer including a second pair of differentially energized electromagnets 31 and 33 is shown diagrammatically in FIGURE 8 to produce a torque about the x axis to cause precession of rotor 21 about the y axis.

Gyroscope 20 is operated in a so-called caged mode. The output of pickoff plate pair 23 and 24 is applied via a caging amplifier 57 to the y axis torquer consisting of electromagnets 28 and 29. Similarly, the output of pickoff plate pair 25 and 26 is applied via a caging amplifier 58 to the x axis torquer consisting of electromagnets 31 and 33. Upon deflection of rotor 21 relative to case 22, torquers 28, 29 and 31, 33 are operative to restore rotor 21 to the undeflected position and the caging current supplied to the torquers is a measure of the torque required to maintain a null condition. The output of caging amplifier 57 is also applied via leads 32 and a switch 56 to summing amplifier 53 (see FIGURE 3). The gain of amplifier 57 is high enough so that when switch 56 is closed, the output of amplifier 57 overrides the signal from pickoff 50″ of rate gyro 10, as will be explained more fully hereinafter.

Gyroscope 20 is designed and constructed to have an error rate, or uncertainty in sensing the condition of zero angular velocity in inertial space, which is substantially less than 0.001 degree per hour. Thus, the instrument must be and is of high quality or so-called navigation grade to achieve the objects of the present invention.

In operation, space vehicle 2 is assumed to have, after launching, any arbitrary attitude and rate of change of attitude. Switches 54, 55 and 56 are initially open. The amplified outputs of rate gyroscopes 8, 9 and 10 are applied to reaction rotors 15, 16 and 17 to bring the vehicle to a condition of zero rate in roll, pitch and yaw; that is, to tend to stabilize vehicle 2 to be irrotational in inertial space.

Switches 54, 55 and 56 are then closed. The output of sun tracker 3 is applied to amplifiers 51 and 52 as an overriding or monitoring control. Assuming the sun to be within the field of sun tracker 3, a pair of signals are applied to rotors 15 and 16 to change the attitude of vehicle 2 until the z axis is alined with the radius vector from the sun. At this time, however, the vehicle may have any arbitrary attitude about the z axis. It should be noted that if the sun is not in the field of view of sun tracker 3, acquisition of the sun may be brought about by applying, to rate gyroscope 9, a bias signal so as to roll vehicle 2 about the x axis until the sun appears in the tracker field. The system as so far described is well known in itself.

Figure 9:
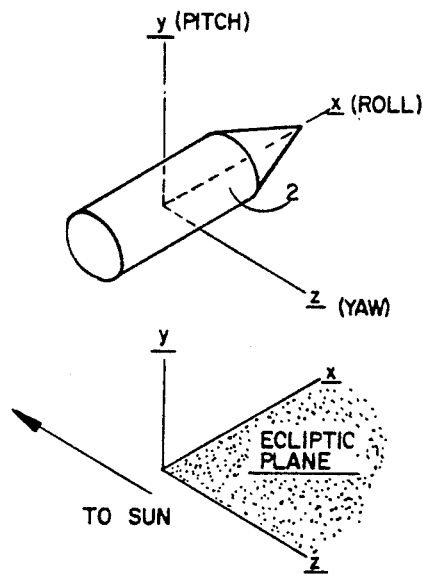
FIGURE 9 shows the attitude of the space vehicle as a result of the operation of the present invention.

Consider now the function of gyroscope 20. Rotor 21 tends to retain angular fixity in inertial space, whereas vehicle 2 is rotating relative to inertial space as the z axis, which is alined along the solar radius vector, turns about the sun at the rate of about one degree (0.9856° mean) per day, or 0.04 deg./hr. Accordingly, and in general, signals will appear at both pairs of pickoffs 23, 24 and 25, 26. The amplified signal from pickoff 23, 24 is applied as described above via amplifier 57 to the y axis torquer consisting of electromagnets 28 and 29, and also via leads 32, switch 56 and summing amplifier 53 to z axis reaction rotor 17 as an overriding control to orient vehicle 2 about the z axis until the caging currents go to zero. This condition can only hold when the x axis lies in or parallel to the ecliptic, the attitude of vehicle 2 being as shown in FIGURE 9. If the x axis is angularly displaced from the ecliptic plane, a caging torque will exist at the y axis torquer as is necessary to constrain rotor 21 to case 22. In other words, gyroscope 20 is caused to seek the axis of zero rate in inertial space which is in or parallel to the ecliptic. Thus, space vehicle 2 is temporarily stabilized in alinement along the solar radius vector and in the ecliptic plane.

A star tracker of known type is provided including a telescope 35 fitted with photodetector means, not shown, for generating a phase and amplitude sensitive signal when the star lies off axis. The telescope may be mounted in a two-axis altazimuth fashion, with angle measuring readout devices 36 and 37 on the two axes, for measuring azimuth and altitude (elevation) angles, respectively.

The celestial longitude of vehicle 2 is known for any time of year. Therefore, it is possible to compute the azimuth and altitude angles of any selected star by a process analogous to the conversion of right ascension and declination to azimuth and elevation in terrestrial navigation. Telescope 35 may be pointed at such angles, manually or automatically, and the star will be found on or near the optical axis of the telescope. As soon as the star is acquired, switches 54, 55, and 56 may be opened and the vehicle changed to any desired attitude by biasing pickoffs 50, 50′ and 50″ of rate gyroscopes 8, 9 and 10, respectively. Such biasing may be done by any suitable known means such as by use of a potentiometer 80 and a battery 81 shown in conjunction with rate gyroscope 8.

The star tracker is caused to track the star during such change in attitude by servo means well known in the art.

By operation of the present invention, a star will be found on axis with an error determined by (1) errors in the sun tracker as regards angular displacement about the x and y axes, and (2) drift rate of gyroscope 20 about its x axis caused by error torque acting about the y axis. Error contribution by sun tracker 3 is readily made negligible. Thus, even with relatively simple equipment, the solar tracking error can be kept to a few minutes of arc.

As for gyroscope 20, any error (drift producing) torque acting about the y axis results in an error in the ecliptic indication, numerically equal to $\omega/\omega'$, where $\omega$ is the earth's mean orbital rate of 0.9856 degree/day or about 0.04 degree/hour and $\omega'$ is the equivalent gyro drift rate (about the x axis) as expressed by the equation $L_y = \omega'H$ where $L_y$ is disturbing torque about the y axis and H is gyro rotor angular momentum.

A convenient star tracker search field size is of the order of 0.01 radian or 0.57°, half-angle. Accordingly, to insure that a selected star will be within this field limit, the gyro drift rate should be not more than (0.04)(0.01) or $4 \times 10^{-4}$ degrees/hour. This is high quality performance, but is attainable without undue difficulty under the relatively benign space conditions of zero sensed steady acceleration and very low vibration level.

The present invention is not limited to use with gyroscopes of the particular type described in connection with FIGURES 3 and 6, provided accuracy requirements are met. For example, gyroscopes of single degree of freedom type with feedback caging circuits can be used as will be described in connection with FIGURE 10.

Figure 10:
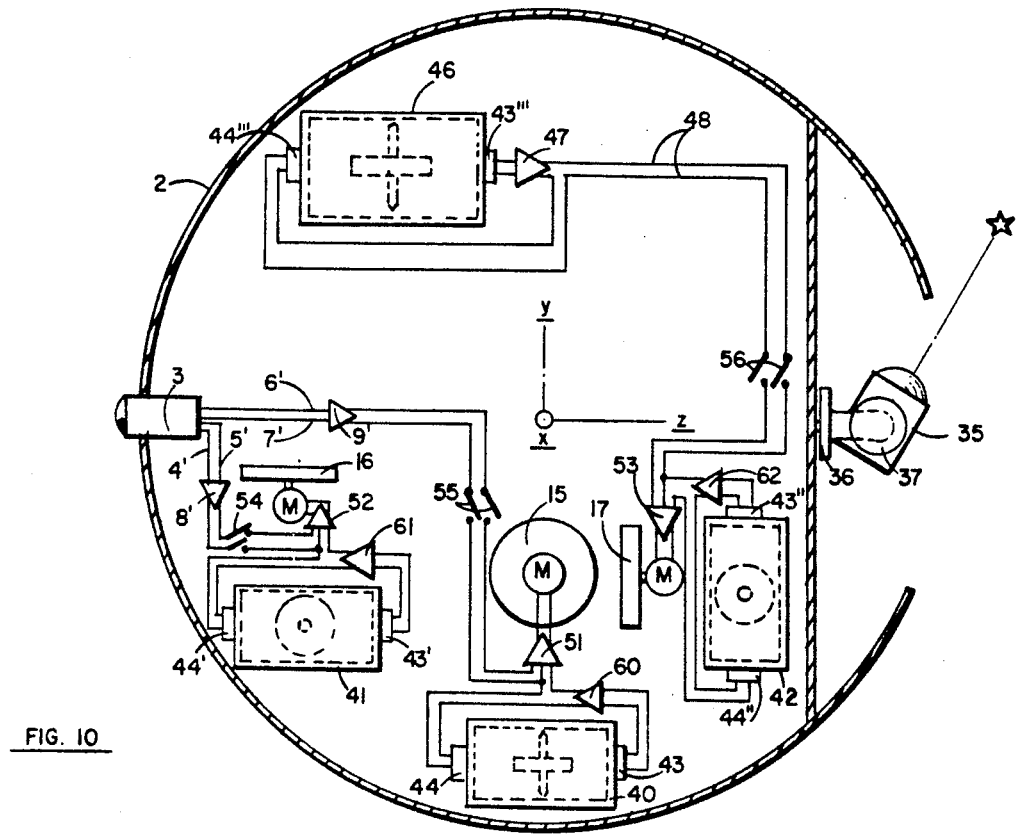
FIGURE 10 shows a second embodiment of the present invention, installed in a space vehicle.

Referring now to FIGURE 10, three such single-axis gyroscopes 40, 41 and 42 are provided for vehicle stabilization about the x, y and z axes, respectively, the gyroscopes being of the type described on pages 23 and 57 of "Inertial Guidance Sensors," supra. Each of gyroscopes 40, 41 and 42 has an output axis pickoff 43, 43′ and 43″, respectively, the signals from which are amplified by caging amplifiers 60, 61 and 62 and applied to an output axis torquer 44, 44′ and 44″ on gyroscopes 40, 41 and 42, respectively. The corresponding reaction rotors 15, 16 and 17 are connected into these caging circuits. In other words, the output of caging amplifier 60 is applied via summing amplifier 51 to reaction rotor 15, the output of caging amplifier 61 is applied via summing amplifier 52 to reaction rotor 16 and the output of caging amplifier 62 is applied via summing amplifier 53 to reaction rotor 17. Leads 4′ and 5′ from sun tracker 3 are connected via amplifier 8′ and switch 54 to summing amplifier 52 as in FIGURE 3. Similarly, leads 6′ and 7′ from sun tracker 3 are connected via amplifier 9′ and switch 55 to summing amplifier 51 as in FIGURE 3.

In operation, switches 54, 55 and 56 being open, gyroscopes 40, 41 and 42 serve to stabilize vehicle 2 about the x, y and z axes, respectively. Thus, any angular drift rate component of the vehicle about any of the three axes is sensed by gyroscopes 40, 41 and 42 and a caging current appears which is supplied to the appropriate reaction rotor to change the vehicle attitude. This assemblage of gyroscopes and reaction type attitude controls is known in itself. Gyroscopes 40, 41 and 42 ordinarily have quite moderate accuracy requirements expressable as drift rates of the order of 0.1 to 1 degree/hour.

According to the present invention, an additional x axis gyroscope 46 is provided which must be of high quality, typically of the order of 0.004 degree/hour drift rate. Gyroscope 46 has an output axis pickoff 43‴, the signal from which is amplified by caging amplifier 47 and applied to an output axis torquer 44‴. In addition, the signal from amplifier 47 is applied via leads 48 and switch 56 to summing amplifier 53.

When switches 54, 55 and 56 are closed, sun tracker 3 exerts a control on reaction rotors 15 and 16, as in FIGURE 3, which overrides control by gyroscopes 40 and 41. Gyroscope 46 similarly exerts an overriding control on the z axis reaction rotor 17, the gain in caging amplifier 47 being set much higher than that in caging amplifier 62 of gyroscope 42. If the x axis is inclined relative to the ecliptic, gyroscope 46 senses a component of orbital revolution rate, the resulting caging current signal being applied to the z axis controller system (gyroscope 42 and reaction rotor 17) to reduce such inclination.

After orientation of vehicle 2 with respect to the ecliptic plane and the solar radius vector, a star may be acquired as already described. Then switches 54, 55 and 56 may be opened and vehicle 2 changed to any desired attitude, star tracker 35 remaining fixed on the acquired star.

The principles of the present invention remain applicable if the moon is substituted for the sun, tracker 3 then functioning as a moon tracker. The center of the earth at any instant of time has a unique position in terms of selenocentric (moon-centered) coordinates. The relatively high orbital revolution rate of the moon, 0.5 degree/hour as compared with 0.04 degree/hour for the earth about the sun, reduces gyroscope accuracy requirements. However, the moon is much closer to the earth than is the sun, thereby causing the function of the craft position (in selenocentric coordinates) versus time to be modulated at orbital frequency through $\pm 1°$ approximately, so that a star tracker of somewhat wider field is required than in the case of sun tracking.

Although the present invention has been described as applied to a vehicle in orbit about the earth, such restriction is not necessary. It may equally well be used in vehicles in earth-moon orbits or, with a slight modification, to interplanetary orbits. Thus, consider a vehicle in an earth-Mars orbit, wherein it is desired to keep the guidance apparatus dormant for a substantial part of the course to save power and on demand to activate it for celestial navigation. The heliocentric latitude of the vehicle in this case is known to have always a small value, not more than about 1°, inasmuch as the orbit of Mars is inclined to that of the earth by an angle of less than 2°. The heliocentric longitude will be known approximately, either by measurements made from the earth or by an extrapolation computer in the vehicle. Accordingly, at the desired time, the system can be activated to acquire the sun as described, and to determine the plane of the ecliptic. The orbital angular velocity of the vehicle in this example is less than that in the earth-orbiting case, as it ranges from about 1 degree/day while near the earth to about half this value near Mars, but the magnitude of the velocity is still sufficient for location of the ecliptic by the inertial means described. On a mission to Venus or Mercury the orbital velocity would be greater than in the Earth case, favoring the invention.

I claim:

1. A guidance system for use with a vehicle whose path in space is always in or near the ecliptic plane, comprising, in combination:
   means for providing attitude control of said space vehicle about first, second and third mutually orthogonal axes to be aligned nominally in the ecliptic plane, normal to the ecliptic plane and along the solar radius vector, respectively;
   means carried by said vehicle for determining the line of sight to the sun, said means being operatively coupled to said first and second axes attitude control means for orienting said vehicle so that said third axis is along said solar radius vector;
   gyroscope means for sensing said vehicle's rotation rate in inertial space about said second axis and for providing a signal as a function of said sensed rate; and
   means for coupling said signal to said third axis attitude control means for orienting said vehicle until said signal is reduced to zero, said vehicle's first axis then lying in or parallel to the ecliptic plane.

2. The system of claim 1 wherein said means for determining the line of sight to the sun comprises a sun tracker having an object field of substantially a hemisphere and having a plurality of photodetector electrodes disposed in the focal plane of said telescope to provide at least two signals indicative of the displacement of the sun image along said first and second axes from the center of said focal plane.

3. The system of claim 1 wherein said gyroscopic means comprises:
   a free rotor gyroscope having a rotor and a case, said rotor being mounted for three degrees of angular freedom elative to said case;
   two-axis pickoff means for providing first and second pickoff signals, the phases and amplitudes of which are indicative of the direction and amount of deflection of said rotor with respect to said case along said first and second axes, respectively; and
   two-axis torquer means responsive to said pickoff signals for torquing said rotor to an undeflected position, said first signal being coupled to said third axis attitude control means to orient said vehicle until said first signal is reduced to zero.

4. The guidance system of claim 1 further comprising:
   a plurality of rate gyroscopes, one for each of said first, second and third axes, for providing first, second and third signals as a function of said vehicle's rotation rate about each of said axes, respectively; and
   wherein said attitude control means comprises:
   a plurality of inertial means, one for each of said first, second and third axes, and responsive to said first, second and third signals, respectively, for adjusting the attitude of said vehicle so as to null said first, second and third signals and to stabilize said vehicle in inertial space.

5. The guidance system of claim 4 further comprising:
   switch means operatively coupled between said line of sight determining means and said first and second axes inertial means for applying the output of said line of sight determining means to said inertial means so as to override the signals from said first and second axes rate gyroscopes, respectively, to change the attitude of said vehicle until said third axis is along said solar radius vector.

6. The guidance system of claim 5 wherein said means for coupling said signal from said gyroscopic means to said third axis reaction means comprises:
   switch means operatively coupled between said gyroscopic means and said third axis inertial means for applying the signal from said gyroscopic means to said third axis inertial means so as to override the signal from said third axis rate gyroscope to change the attitude of said vehicle until said signal is reduced to zero, said vehicle's first axis then lying in or parallel to the ecliptic plane.

7. The guidance system of claim 5 wherein said gyroscopic means comprises:
   a free rotor gyroscope having a rotor and a case, said rotor being mounted for three degrees of angular freedom relative to said case;
   two-axis pickoff means for providing first and second pickoff signals, the phases and amplitudes of which are indicative of the direction and amount of deflection of said rotor with respect to said case along said first and second axes, respectively; and
   two-axis torquer means responsive to said pickoff signals for torquing said rotor to an undeflected position.

8. The guidance system of claim 7 wherein said means for coupling said signal from said gyroscopic means to said third axis reaction means comprises:
   switch means operatively coupled between said gyroscopic means and said third axis inertial means for applying said first pickoff signal from said pickoff means to said third axis inertial means so as to override the signal from said third axis rate gyroscope to change the attitude of said vehicle until said first pickoff signal is reduced to zero, said vehicle's first axis then lying in or parallel to the ecliptic plane.

9. A guidance system for use with a space vehicle comprising, in combination:
 means carried by said vehicle for determining the line of sight to the sun so as to determine two of the three angles necessary for astronomical position determination; and
 gyroscopic means for sensing said vehicle's rotation rate in inertial space about an axis normal to the ecliptic plane so as to determine the third angle necessary for astronomical position determination.

10. A guidance system as specified in claim 9 further comprising:
 means responsive to said line of sight determining means and said gyroscopic means for orienting said space vehicle so as to be aligned with respect to said line of sight and to be irrotational about said axis normal to said line of sight.

References Cited
UNITED STATES PATENTS 3,116,035   12/1963   Cutler _____ 244—1
3,206,141   9/1965   Dryden _____ 244—1

FERGUS S. MIDDLETON, *Primary Examiner.*

U.S Cl. X.R.

250—203; 235—150.26